United States Patent
Kniffin et al.

(10) Patent No.: US 10,578,641 B2
(45) Date of Patent: Mar. 3, 2020

(54) METHODS AND SYSTEMS FOR ELECTRICALLY CALIBRATING TRANSDUCERS

(71) Applicant: FREESCALE SEMICONDUCTOR INC., Austin, TX (US)

(72) Inventors: Margaret Leslie Kniffin, Chandler, AZ (US); Keith Kraver, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 617 days.

(21) Appl. No.: 15/243,767

(22) Filed: Aug. 22, 2016

(65) Prior Publication Data
US 2018/0052185 A1 Feb. 22, 2018

(51) Int. Cl.
| G01P 21/00 | (2006.01) |
| G01L 27/00 | (2006.01) |
| G01D 18/00 | (2006.01) |
| G01P 15/125 | (2006.01) |

(52) U.S. Cl.
CPC ............ *G01P 21/00* (2013.01); *G01D 18/008* (2013.01); *G01L 27/002* (2013.01); *G01P 15/125* (2013.01)

(58) Field of Classification Search
CPC ...................................................... G01P 21/00
USPC .......................................................... 73/1.38
See application file for complete search history.

(56) References Cited

U.S. PATENT DOCUMENTS

| 5,220,519 A * | 6/1993 | Eller ................... G01R 31/2834 |
| | | 702/116 |
| 7,093,478 B2 | 8/2006 | Chau et al. |
| 8,464,571 B1 * | 6/2013 | Sparks .................... G01P 21/00 |
| | | 702/104 |
| 8,701,459 B2 | 4/2014 | Geen |
| 2009/0012772 A1 * | 1/2009 | Zheng .................... G05B 17/02 |
| | | 703/18 |
| 2014/0096587 A1 | 1/2014 | Stewart et al. |
| 2014/0074418 A1 | 3/2014 | Lin et al. |
| 2014/0083164 A1 | 3/2014 | Homeijer et al. |
| 2014/0244198 A1 | 8/2014 | Mayer |
| 2014/0288443 A1 | 9/2014 | Meriheina et al. |

(Continued)

FOREIGN PATENT DOCUMENTS

EP 1371324 A1 12/2003

OTHER PUBLICATIONS

Guerrero E et al: "Offset and gain calibration circuit for MIMISFET devices", Analog Integrated Circuits and Signal Processing, May 8, 2013 (May 8, 2013), pp. 321-333, vol. 76, No. 3, Springer New York LLC, US.

(Continued)

*Primary Examiner* — Walter L Lindsay, Jr.
*Assistant Examiner* — Philipmarcus T Fadul

(57) ABSTRACT

Devices, systems and methods are provided for calibrating a transducer. One exemplary method involves determining a transfer function for the transducer based on a measured response of the transducer to an applied electrical signal, determining a set of values for a plurality of response parameters associated with the transducer based on the transfer function, determining a calibration coefficient value associated with the transducer based at least in part on the set of values and a correlation between physical sensitivity and the plurality of response parameters, and storing the calibration coefficient value in association with the transducer.

19 Claims, 6 Drawing Sheets

(56) References Cited

U.S. PATENT DOCUMENTS

2015/0198628 A1 7/2015 Kniffin et al.
2016/0152464 A1 6/2016 Sessego et al.
2016/0341762 A1* 11/2016 Waters .................. G01C 19/04

OTHER PUBLICATIONS

McAndrew, Colin C., "Statistical Modeling for Circuit Simulation," IEEE, Quality Electronic Design, Mar. 2003, pp. 357-362.

* cited by examiner

METHODS AND SYSTEMS FOR ELECTRICALLY CALIBRATING TRANSDUCERS

TECHNICAL FIELD

Embodiments of the subject matter described herein relate generally to semiconductor devices, and more particularly, embodiments of the subject matter relate to calibrating a transducer of a semiconductor device that is responsive to a physical stimulus using an electrical stimulus.

BACKGROUND

Sensors and other transducers are used in a variety of applications. For example, an electronic device may include a sensor that is fabricated on a semiconductor die and generates electrical signals indicative of the magnitude of the sensed property that is exerted on or is otherwise proximate to the semiconductor die. Microelectromechanical systems (MEMS) are widely used in a variety of sensing applications. For example, a MEMS pressure sensor may be implemented on a semiconductor die to generate electrical signals indicative of the amount of pressure exerted on the semiconductor die (or a portion thereof), or a MEMS accelerometer may generate electrical signals indicative of the rate and/or direction of acceleration of the semiconductor die. Various applications use multiple different MEMS sensors to measure different properties, as desirable. For example, in an automotive application, a MEMS pressure sensor may be utilized to measure tire pressure while a MEMS accelerometer may be utilized to measure the vehicle acceleration.

In practice, process variations affect characteristics of MEMS components fabricated on a semiconductor die, which, in turn, can undesirably influence the measurement of the sensed property. For example, process variations can cause some dies or MEMS sensors to fail to comply with design specifications without some additional calibration. However, individually calibrating devices designed to respond to a physical stimulus can be time consuming or costly. For example, a semiconductor wafer may include a relatively large number of MEMS sensors fabricated at various locations thereon, where process variations associated with the relative location of each sensor may cause that sensor to perform differently than other sensors on the same wafer. Thus, calibrating the sensors traditionally requires subjecting each sensor to a physical stimulus, with the resulting output being measured and utilized to determine calibration coefficients on a device by device basis. Accordingly, it is desirable to be able to calibrate sensors responsive to physical stimulus in a quicker and more cost effective manner. While various calibration techniques have been proposed, they often entail resonant frequency, which can be difficult to measure in overdamped systems.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures, which are not necessarily drawn to scale.

FIG. 6 depicts a cross-sectional view of the inertial sensing arrangement along line 6-6 in FIG. 7 and FIG. 7 depicts a top view of the inertial sensing arrangement

DETAILED DESCRIPTION

Embodiments of the subject matter described herein generally relate to electrically stimulating transducers responsive to a physical (or nonelectrical) stimulus to thereby electrically calibrate the physical sensitivity of the transducers in lieu of relying on an applied physical stimulus and in a manner that accounts for manufacturing variations, such as, for example, fabrication process variations for transducers fabricated on a semiconductor die. As used herein, a transducer should be understood as referring to any element, component, or arrangements thereof that are sensitive or otherwise responsive to a stimulus and convert energy imparted by that stimulus into a corresponding electrical signal. In this regard, the transducer senses or is otherwise responsive to an external or extrinsic physical property that is applied to the transducer, or to which the transducer is otherwise subjected to. For purposes of explanation, exemplary embodiments may be described herein in the context of inertial transducers, however, it should be appreciated that the subject matter described herein is not necessarily limited to use with any particular type of transducer or sensor.

As described in greater detail below in the context of FIGS. 1-2, in exemplary embodiments, an electrical signal is applied to the transducer and a resulting electrical response is measured at or from the electrical output of the transducer. Based on the relationship between the measured electrical response and the applied electrical signal, a transfer function of the transducer can be determined. In exemplary embodiments, the electrical signal is applied at different power levels (or different voltage levels) to obtain measured electrical responses and corresponding transfer functions for different applied signal levels. Using the different transfer functions, curve fitting is performed to determine second-order system response parameters associated with that individual transducer at the different voltage levels. Thereafter, the system response parameters are mapped to a corresponding calibration coefficient value which is stored or otherwise maintained in association with the transducer. The stored calibration coefficient value is then utilized to determine a calibrated response of the transducer to a subsequent physical stimulus based on the electrical response at the electrical output of the transducer resulting from that physical stimulus and the calibration coefficient value.

Figure 1:
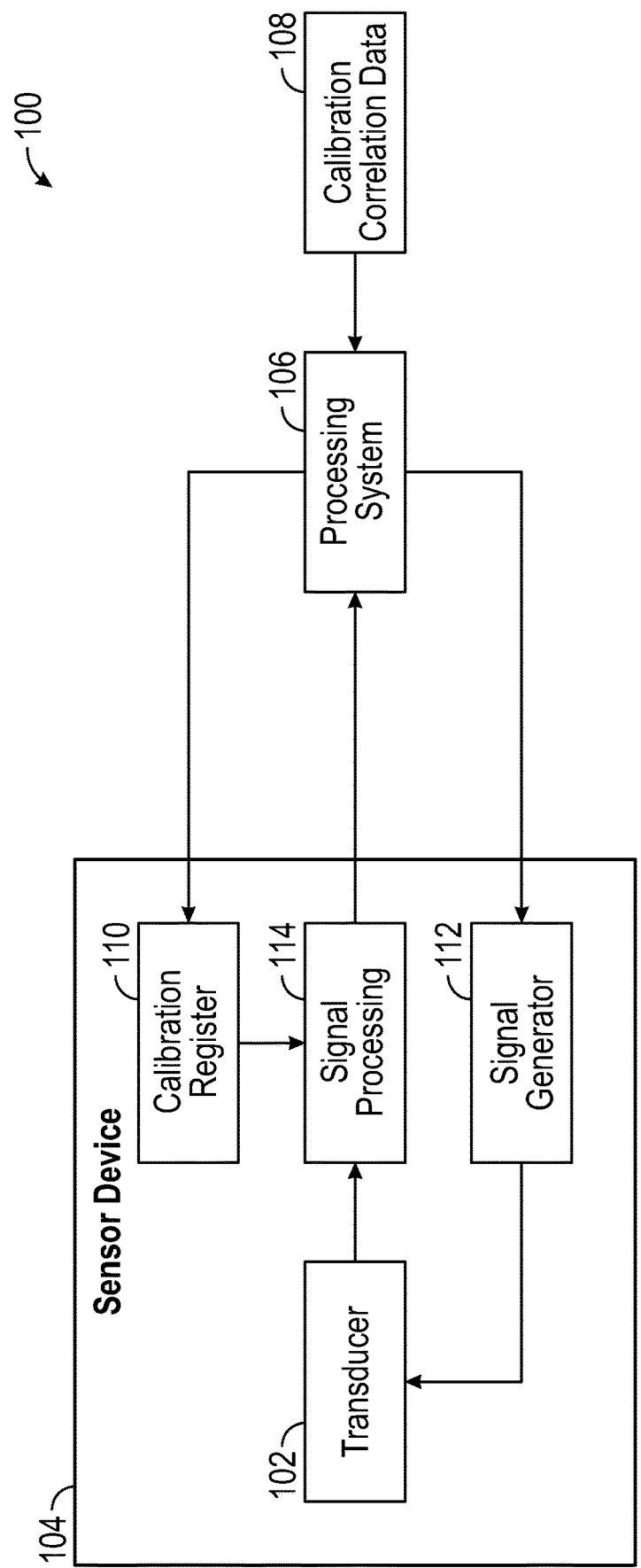
FIG. 1 depicts a block diagram of a calibration system for a transducer in accordance with one or more embodiments of the invention.

FIG. 1 depicts an exemplary embodiment of a calibration system 100 for calibrating a transducer 102, such as a microelectromechanical system (MEMS) sensing arrangement incorporated in a semiconductor device package 104. A processing system 106 is coupled to the semiconductor device 104 and configured to initiate application of input electrical signals to the transducer 102 and obtain corresponding response signals, which, in turn are utilized by processing system 106 to determine transfer functions of the transducer 102 and corresponding system parameters associated with the transducer 102. The processing system 106 includes or otherwise accesses a data storage element 108 having calibration correlation data stored therein, which, in turn is utilized by the processing system 106 to map, convert, or otherwise correlate the system parameters to one or more calibration coefficient values for the transducer 102. In exemplary embodiments, the one or more calibration coefficient values are stored or otherwise maintained by the semiconductor device 104 in association with the transducer 102 and are utilized to determine calibrated measurements of a physical stimulus, as described in greater detail below.

For purposes of explanation, but without limitation, the semiconductor device 104 may alternatively be referred to herein as a sensor device. In exemplary embodiments, the sensor device 104 includes a data storage element 110 to maintain calibration values associated with the transducer 102, a signal generation arrangement 112 (or signal generator) coupled to the transducer 102, and a signal processing arrangement 114 coupled to the transducer 102. It should be noted that the subject matter described herein is not necessarily limited to any particular type of transducer 102, however, for purposes of explanation, the subject matter may be described herein in the context of the transducer 102 being realized as a MEMS inertial sensor including sense electrodes having capacitance indicative of the inertial forces that the transducer 102 is subjected to. In this regard, as described in greater detail below in the context of FIGS. 7-8, the transducer 102 may be realized as an overdamped torsional acceleration sensor having sense electrodes with respective capacitances corresponding to the magnitude of a gap between a respective sense electrode and a proof mass structure.

Still referring to FIG. 1, the signal generation arrangement 112 generally represents the circuitry, logic, hardware, and/or other components configured to generate calibration reference input electrical signals for the transducer 102 at different energy levels in response to commands from the processing system 106. In this regard, one or more control inputs to the signal generator 112 may be connected to corresponding one or more input interfaces of the sensor device 104 (e.g., a pin, pad, terminal, or the like) to receive, from the processing system 106, input control signals indicative of the energy level (or voltage level) and potentially other characteristics (e.g., frequency, duration, or the like) of calibration reference electrical signals to be applied to the transducer 102. One or more outputs of the signal generator 112 are coupled to corresponding input/output nodes of the transducer 102 to apply the calibration reference electrical signals to the transducer 102. In this regard, in one or more embodiments, the outputs of the signal generator 112 are electrically connected to nodes of the sense electrodes of the transducer 102 to apply the calibration reference electrical signals to the sense electrodes of the transducer 102.

In exemplary embodiments, the signal generator 112 is capable of generating a pseudorandom voltage signal applied across the sense electrodes of the transducer 102, for example, by alternately switching a voltage signal from being applied across nodes of a positive sense electrode or nodes of a negative sense electrode in a pseudorandom sequence. That said, it should be appreciated that the subject matter described herein is not limited to pseudorandom voltage signals or any particular type of signal, and in practice, other calibration reference electrical signals having desired spectral characteristics (e.g., white noise or the like) may be applied to the transducer 102 in an equivalent manner to obtain a response to the signal from the transducer 102. In exemplary embodiments, the signal generator 112 is capable of varying the voltage level of the pseudorandom voltage signal, to thereby obtain responses from the transducer 102 corresponding to different voltage levels, as described in greater detail below.

The signal processing arrangement 114 generally represents the circuitry, logic, hardware, and/or other components configured to sample or otherwise obtain output electrical signals from the transducer 102 and convert those electrical signals into a corresponding output indicative of the response by the transducer 102 to a physical stimulus. In this regard, depending on the embodiment, the signal processing arrangement 114 may include any number and type of signal conversion circuitry, filtering circuitry, sampling circuitry, transmitter circuitry, or the like. In an exemplary embodiment, the transducer 102 includes a pair of sense electrodes having a capacitance indicative of a physical stimulus exerted on the transducer 102 or which the sensor device 104 is otherwise subjected to, with the signal processing arrangement 114 including one or more capacitance-to-voltage conversion arrangements to convert the capacitance of the sense electrodes to corresponding voltage signals indicative of the magnitude (or another characteristic) of the physical stimulus. Additionally, the signal processing arrangement 114 may include one or more analog-to-digital conversion arrangements coupled to the capacitance-to-voltage conversion arrangement(s) to generate a digital representation of the physical stimulus, along with one or more transmitter arrangements coupled to the analog-to-digital conversion arrangements to transmit or otherwise provide the digital representation of the physical stimulus to the processing system 106 via an output interface (e.g., pin, pad, terminal, or the like) coupled to the processing system 106.

The data storage element 110 may be realized as any sort of memory element or other non-transitory data storage media configured to support operation of the sensor device 104 described herein. That said, in one or more exemplary embodiments, the data storage element 110 is realized as one or more registers, and accordingly, the data storage element 110 may alternatively be referred to herein as a calibration register. In exemplary embodiments, the signal processing arrangement 114 is coupled to the calibration register 110 to retrieve or otherwise obtain one or more calibration coefficient values stored therein, which, in turn, are utilized to calculate or otherwise determine a calibrated digital representation of the characteristic of the physical stimulus that was sensed by the transducer 102. In this regard, prior to the calibration processes described herein, the calibration register 110 may be initialized with a nominal value for the linear trim coefficient and zero values for any offset trim coefficients, so that the output provided by the signal processing arrangement 114 represents an uncalibrated measurement of the physical stimulus prior to a calibration coefficient value being stored or otherwise loaded into the calibration register 110.

Depending on the embodiment, the components of the sensor device 104 may be fabricated or otherwise formed on the same substrate or different substrates. For example, in one embodiment, the transducer 102, the calibration register 110, the signal generation arrangement 112 and the signal processing arrangement 114 may be formed or fabricated on a common semiconductor die. That said, in other embodiments, the transducer 102, the calibration register 110, the signal generation arrangement 112 and the signal processing arrangement 114 may be formed or fabricated on different semiconductor dies that are then be mounted or otherwise affixed to a lead frame or another package substrate and encapsulated to provide an integrated sensor device 104. For example, in one or more embodiments, the transducer 102 is fabricated on a first semiconductor die (e.g., the sensor die) while the calibration register 110, the signal generation arrangement 112 and the signal processing arrangement 114 are fabricated on a second semiconductor die, which may alternatively be referred to as an application-specific integrated circuit (ASIC) die when the calibration register 110, the signal generation arrangement 112 and the signal processing arrangement 114 are configured to provide ASIC-type functionality.

The processing system 106 generally represents the circuitry, hardware, processing logic and/or other components of the calibration system 100 capable of being coupled to the input/output interfaces of the sensor device 104 and configured to support the calibration processes and the related tasks, functions, and/or operations described herein. Depending on the embodiment, the processing system 106 may include or otherwise be realized as a general purpose processor, a processing unit, a processing core, a microprocessor, a microcontroller, a content addressable memory, a digital signal processor, a field programmable gate array, any suitable programmable logic device, discrete gate or transistor logic, discrete hardware components, or any combination thereof, designed to support operation of the sensor device 104 and/or perform the functions described herein. The data storage element 108 may be realized as any suitable memory element or data storage medium, such as, for example, random access memory (RAM), read-only memory (ROM), flash memory, registers, or another suitable non-transitory computer-readable storage medium configured to support operation of the processing system 106 in conjunction with the calibration system 100. For example, in some embodiments, the data storage element 108 may store computer-executable programming instructions that, when read and executed by the processing system 106, cause the processing system 106 to perform one or more additional tasks, operations, functions, and/or processes described herein. In exemplary embodiments, the data storage element 108 stores or otherwise maintains data or information utilized by the processing system 106 to calculate or otherwise determine one or more calibration coefficient values for a transducer 102 based on a correlation between measured responses to electrical stimuli applied by the signal generator 112 and the sensitivity of the transducer 102 to the physical stimulus to be measured by the transducer 102, as described in greater detail below. In one or more embodiments, the processing system 106 and the data storage element 108 may be integrated or otherwise incorporated in a common computing device.

It should be understood that FIG. 1 is a simplified representation of the calibration system 100 for purposes of explanation and ease of description, and FIG. 1 is not intended to limit the application or scope of the subject matter in any way. Thus, although FIG. 1 depicts direct electrical connections between components, alternative embodiments may employ intervening circuit elements and/or components while functioning in a substantially similar manner. Practical embodiments of the sensor device 104 will likely include any number of input/output (I/O) interfaces (e.g., pins, pads, terminals, or the like) configured to support communications between external devices, components or systems and the sensor device 104. Additionally, it should be noted the subject matter is not limited to the components of the sensor device 104 being fabricated on a common semiconductor substrate or on separate dies that are soldered, affixed, or otherwise mounted to a package substrate, or furthermore, the transducer 102 and other components 110, 112, 114 of the sensor device 104 may be packaged separately as part of discrete devices.

Figure 2:
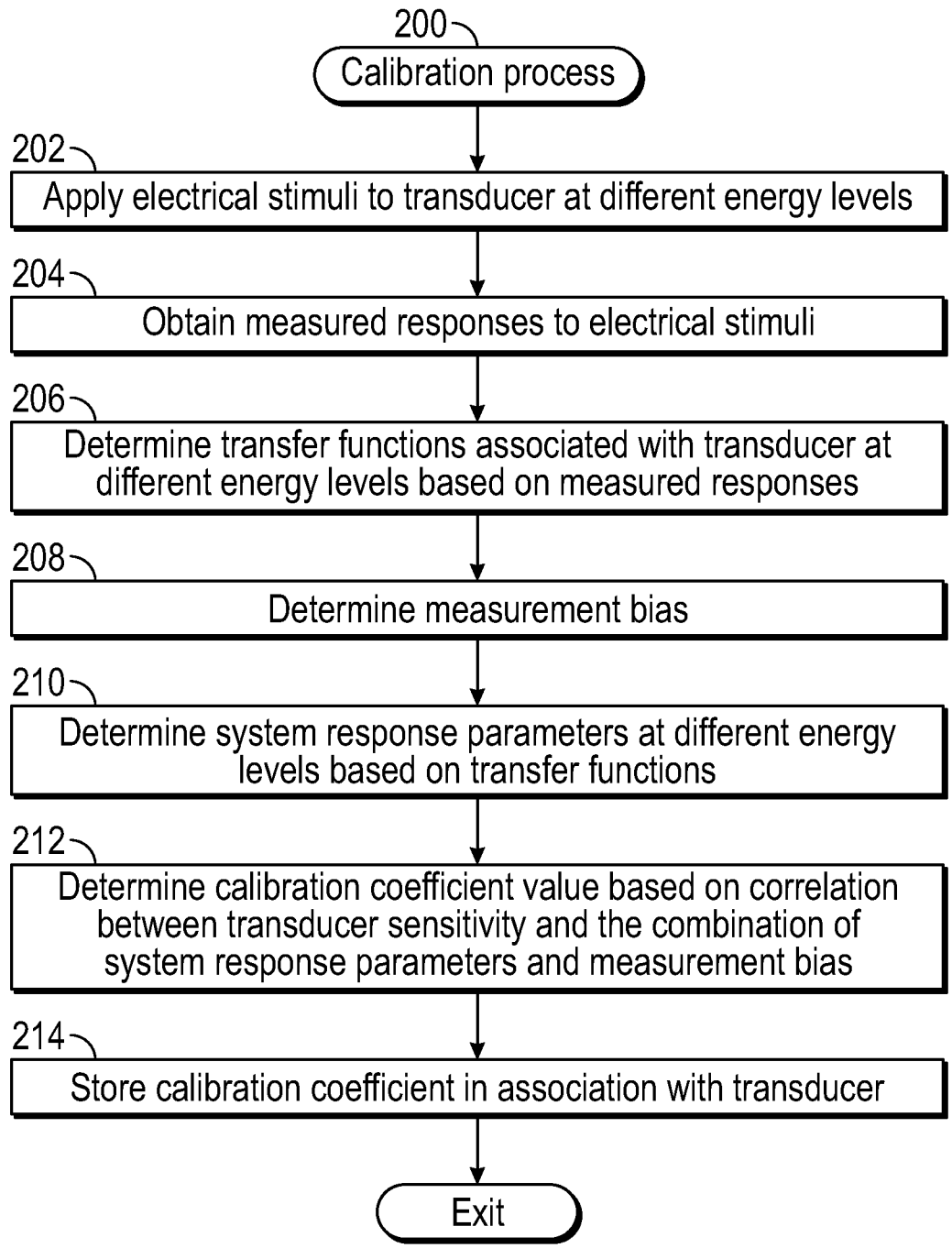
FIG. 2 is a flow diagram illustrating an exemplary calibration process suitable for implementation by the calibration system of FIG. 1 in accordance with one embodiment of the invention.

FIG. 2 depicts an exemplary calibration process 200 for electrically-calibrating the sensitivity of a transducer to a physical stimulus. For illustrative purposes, the following description may refer to elements described above in connection with FIG. 1. In practice, portions of the calibration process 200 may be performed by different elements of the calibration system 100, such as, for example, the sensor device 104, the processing system 106, the signal generator 112, and/or the signal processing arrangement 112. It should be appreciated that practical embodiments of the calibration process 200 may include any number of additional or alternative tasks, the tasks need not be performed in the illustrated order, the tasks may be performed concurrently, or the calibration process 200 may be incorporated into a more comprehensive procedure or process having additional functionality not described in detail herein. Moreover, one or more of the tasks shown and described in the context of FIG. 2 could be omitted from a practical embodiment of the calibration process 200 as long as the intended overall functionality remains intact.

Referring to FIG. 2 with continued reference to FIG. 1, the calibration process 200 initializes or otherwise begins by applying electrical stimuli to a transducer at different energy levels, measuring or otherwise obtaining responses of the transducer to the respective electrical stimuli, and calculating or otherwise determining transfer functions for the transducer at the different energy levels based on the relationship between the applied electrical stimulus and the measured transducer response (tasks 202, 204, 206). For example, the processing system 106 may instruct, command, or otherwise signal the signal generator 112 to provide a first calibration reference electrical input signal having a first voltage level and desired signal characteristics (e.g., frequency or spectral distribution, duration, and the like) and receive or otherwise obtain, from the signal processing arrangement 114, an output corresponding to a measured response of the transducer 102 to the first calibration reference electrical input signal. In this regard, the processing system 106 may obtain a digital output value from the signal processing arrangement 112 that is representative of the voltage signals corresponding to the converted capacitance of the sense electrodes of the transducer 102 in response to the first calibration reference electrical input signal. Thereafter, the processing system 106 may instruct, command, or otherwise signal the signal generator 112 to provide one or more additional calibration reference electrical input signals having a different voltage level and the desired signal characteristics and receive the corresponding measured transducer response outputs from the sensing processing arrangement 114. In this regard, different voltage levels may result in a different capacitances of the sense electrodes of the transducer 102 in response to the applied electrical input signals having otherwise similar signal characteristics, with the different capacitances being indicative of one or more process variations, as described in greater detail below.

Figure 3:
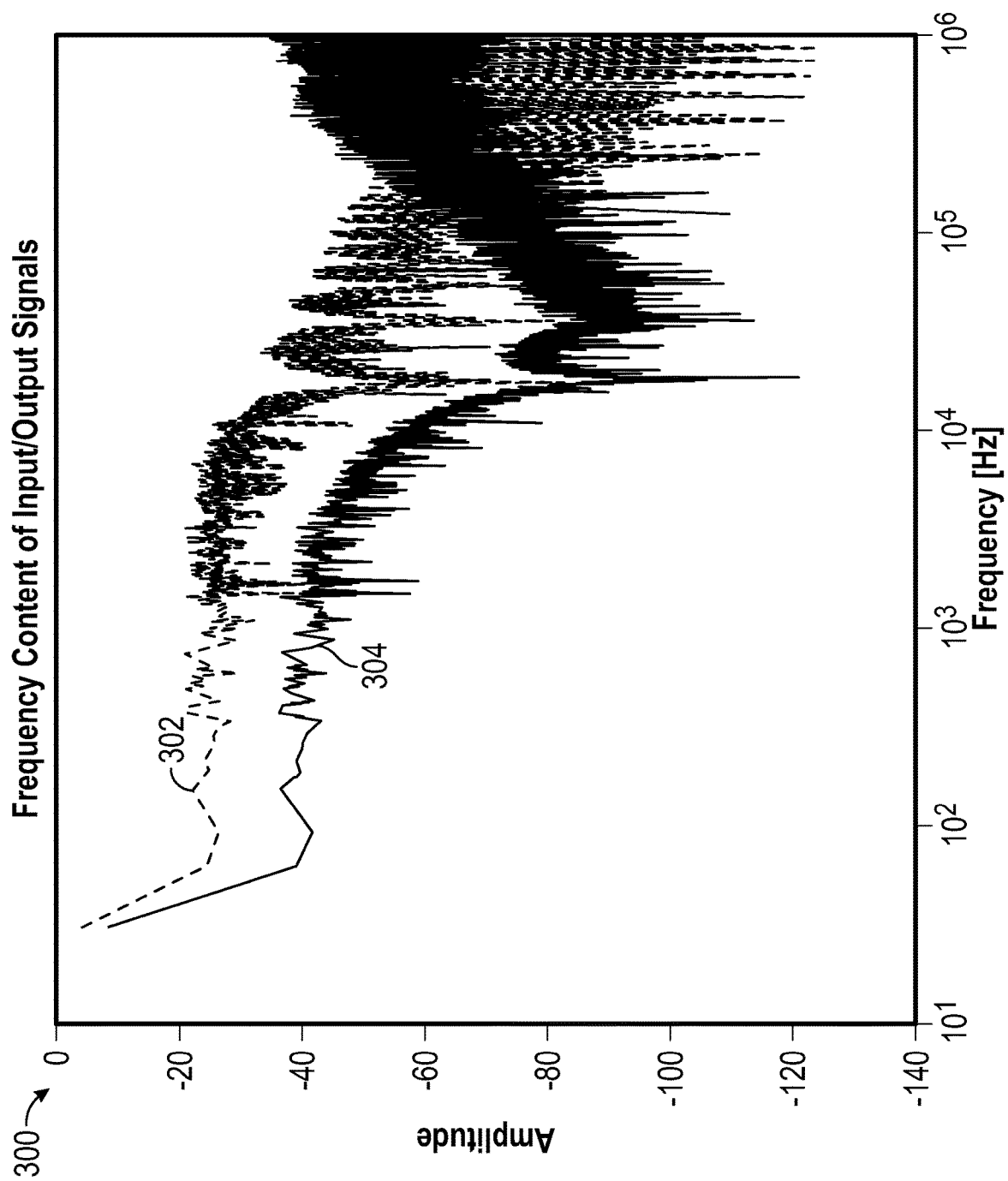
FIG. 3 is a graph depicting a relationship between an applied calibration reference electrical signal and a measured transducer response in accordance with one embodiment of the invention.
Figure 4:
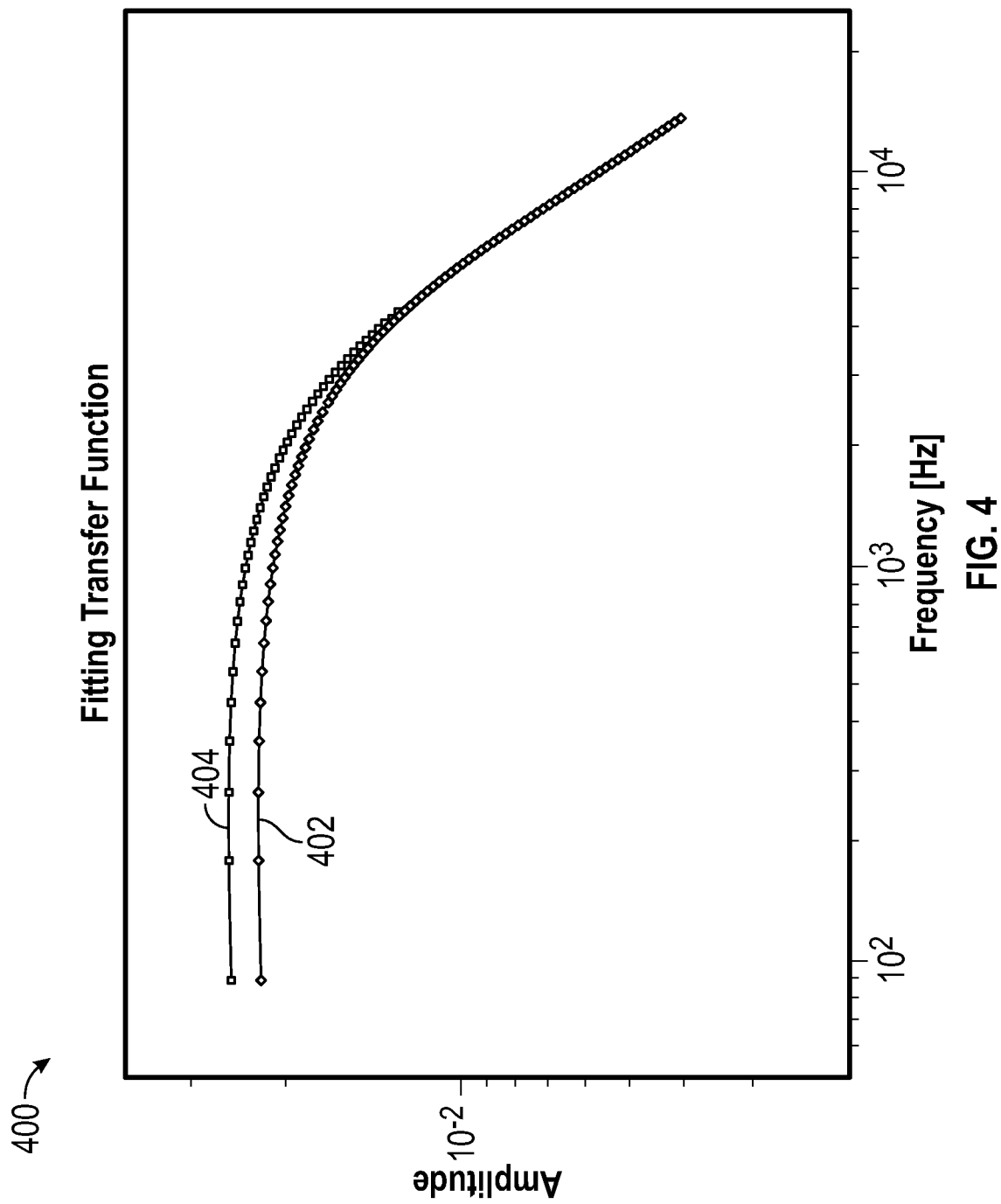
FIG. 4 is a graph depicting transfer function curves corresponding to measured transducer responses to applied calibration reference electrical signals at different voltage levels in accordance with one embodiment of the invention.

In exemplary embodiments, to determine the transfer function of the transducer 102, the processing system 106 converts the calibration reference electrical input signal and the measured transducer response signal to the frequency domain, for example, by performing a Fourier transform, and then divides the measured transducer response signal in the frequency domain by the calibration reference electrical input signal in the frequency domain. For example, FIG. 3 depicts an exemplary graph 300 of a frequency domain representation 302 of a calibration reference electrical input signal applied to the transducer 102 and a frequency domain representation 304 of a measured response from the transducer 102. FIG. 4 depicts an exemplary graph 400 of two different transfer functions 402, 404 calculated or otherwise determined for a transducer in response to a calibration reference electrical signal having two different voltage levels. Prior to generating the transfer functions 402, 404, the calibration reference electrical input signals and the measured transducer response signals may be low-pass filtered to remove higher frequency noise attributable to the signal processing arrangement 114 or other components in the signal path.

Referring again to FIG. 2, in exemplary embodiments, the calibration process 200 also determines the measurement bias associated with the measured transducer response (task 208). In this regard, the processing system 106 calculates or otherwise determines a gain associated with the signal path between the transducer 102 and the processing system 106 (e.g., the gain associated with the signal processing arrangement 114) to account for variations in the signal processing arrangement 114 across different sensor devices 104. For example, the processing system 106 may obtain the output from the signal processing arrangement 114 in the absence of any physical or electrical stimulus. Thus, variations in the electrical output of the sensor device 104 attributable to the signal processing arrangement 114 (e.g., due to process variations associated with fabricating the signal processing arrangement 114) may be isolated.

The calibration process 200 continues by calculating or otherwise determining system parameters associated with the transducer for the different energy levels based on the transfer functions associated with the respective energy levels (task 210). Changing the electrical bias applied to the transducer 102 influences the relative impact of physical features of the transducer 102 (whose geometric characteristics are impacted by fabrication process variations) on the transducer sensitivity to the physical stimulus to be measured, and therefore, system parameters are determined for different energy levels to account for the relationship between transducer sensitivity and bias voltage. In exemplary embodiments, the processing system 106 performs curve-fitting to fit each transfer function representation of the measured electrical response to applied electrical stimulus to the transfer function for a second-order overdamped system and solving for the static response (or direct current (DC) gain) of the transducer 102, the natural frequency of the transducer 102, and the damping ratio of the transducer 102 for that particular energy level. For example, in one embodiment, the processing system 106 fits each transfer function representation of the measured electrical response to the following equation:

$$A(\omega, V) = \frac{AFE_{gain} \cdot DC_{gain}(V)}{\sqrt{(\omega_n(V)^2 - \omega^2)^2 + 4\varsigma(V)^2 \omega_n(V)^2 \omega^2}},$$

where $DC_{gain}(V)$ represents the static response associated with the current voltage level, $\omega_n(V)$ represents the natural frequency associated with the current voltage level, $\varsigma(V)$ represents the damping ratio associated with the current voltage level, and $AFE_{gain}$ represents the measurement bias associated with the measured transducer response. In this regard, the static response (or DC gain) values associated with the different voltage levels may be adjusted to account for the measurement bias and isolate the static response attributable to the process variations associated with the transducer 102 and the transducer sensitivity to electrical bias from the variations associated with the signal processing arrangement 114.

For example, referring to FIG. 4, the processing system 106 determines a first set of system parameters (static response, natural frequency, and damping ratio) that characterizes the physical displacement-to-capacitance relationship for the transducer 102 at a first applied voltage level ($V_1$) based on the transfer function 402 associated with that voltage level by fitting that transfer function curve 402 to the above equation for the transfer function of a second order overdamped system. Similarly, the processing system 106 determines a second set of system parameters that characterizes the physical displacement-to-capacitance relationship for the transducer 102 at a second applied voltage level ($V_2$) based on the transfer function 404 associated with that voltage level by fitting that transfer function curve 404 to the equation for the transfer function of a second order overdamped system. In this regard, for each different energy level, the processing system 106 determines a unique set of system parameters that represent the relationship between the transducer sensitivity and electrical bias.

Still referring to FIG. 2, the calibration process 200 calculates or otherwise determines one or more calibration coefficient values for the transducer based on the system parameter sets and the measurement bias for the transducer based on a correlation between those values and the physical sensitivity of the transducer (task 212). In this regard, the processing system 106 retrieves or otherwise obtains the calibration correlation data set from the data storage element 108 and constructs a calibration correlation matrix that converts the system parameter sets and associated measurement bias into a corresponding estimate of the physical sensitivity of the transducer 102, which, in turn is utilized to determine a calibration coefficient value for the physical sensitivity of the transducer 102. Multiplying the vector of the system parameter values and measurement bias associated with the current sensor device 104 being calibrated by the calibration correlation matrix results in a scalar value corresponding to the estimated sensitivity of the transducer 102 to the physical stimulus to be measured by the transducer 102. Based on the difference between the estimated sensitivity of the transducer 102 under test and the desired or intended sensitivity (e.g., based on design specifications), the processing system 106 may calculate or otherwise determine a corresponding calibration coefficient value representing the linear coefficient of sensitivity for adjusting the electrical response of the transducer 102 to achieve the desired relationship between the electrical response to the physical stimulus (e.g., Volts per unit of acceleration after capacitance-to-voltage conversion). In other embodiments, the calibration correlation matrix may be configured so that the resultant product of multiplying the device under test vector by the calibration correlation matrix results in the calibration coefficient value. That said, it should be noted that the subject matter is not limited to using a calibration correlation matrix, and there are numerous different ways to map the system parameter values and measurement bias of a current device under test to a corresponding sensitivity or calibration coefficient value. For example, the calibration correlation data set may be utilized to calculate or determine different weighting factors associated with the respective system parameters and applied voltage levels or the measurement bias, with the system parameter values and measurement bias of a current device under test being mapped to a corresponding sensitivity or calibration coefficient value by calculating a weighted sum of the system parameter values and measurement bias associated with the current sensor device 104 using the respective weighting factors determined based on the calibration correlation data set.

As described in greater detail below in the context of FIG. 5, the calibration correlation data set includes a plurality of different subsets of data corresponding to different instances of the sensor device 104, where each one of those subsets includes the values of system parameters determined for that respective instance of the sensor device 104 for the different applied energy levels and the measurement bias associated with that respective instance of the sensor device 104, along with a corresponding coefficient value determined for that respective instance of the sensor device 104 based on measurements of the physical sensitivity of the respective instance of the sensor device 104. In this regard, the calibration correlation data set facilitates mapping the current system parameter sets and measurement bias for a current sensor device 104 being electrically-calibrated to a corresponding calibration coefficient value based on the relationships between calibration coefficient values and physical sensitivity of preceding instances of the sensor device 104 and the system parameters and measurement bias values that were previously determined for those preceding instances of the sensor device 104. Thus, the calibration correlation data set allows for the system parameter values and measurement bias associated with the current sensor device 104 to be converted to a likely sensitivity of the transducer 102 with respect to a physical stimulus without having to physically stimulate the transducer 102 or having to determine values for fabrication process values associated with the transducer 102 (e.g., feature thicknesses or widths or other critical dimensions, and the like).

After determining the calibration coefficient value, the calibration process 200 stores or otherwise maintains the calibration coefficient value in association with the transducer for use in subsequently determining calibrated measurements of a physical stimulus (task 214). In the illustrated embodiment of FIG. 1, the processing system 106 stores or otherwise maintains the calibration coefficient value in the register 110 of the sensor device 104 including the transducer 102, which, in turn, may be referenced by the signal processing arrangement 114 associated with the output of the transducer 102 to convert the capacitance of the transducer 102 to a corresponding voltage signal. In this regard, the calibration coefficient value may be initialized to a nominal value so that it does not influence the measured response during the calibration process 200 (e.g., tasks 204 and 208), but after the calibration coefficient value associated with the transducer 102 is set to the determined value, subsequent voltage signals output by the signal processing arrangement 114 are calibrated to achieve desired sensitivity of the sensor device 104 (e.g., Volts per unit acceleration).

Figure 5:
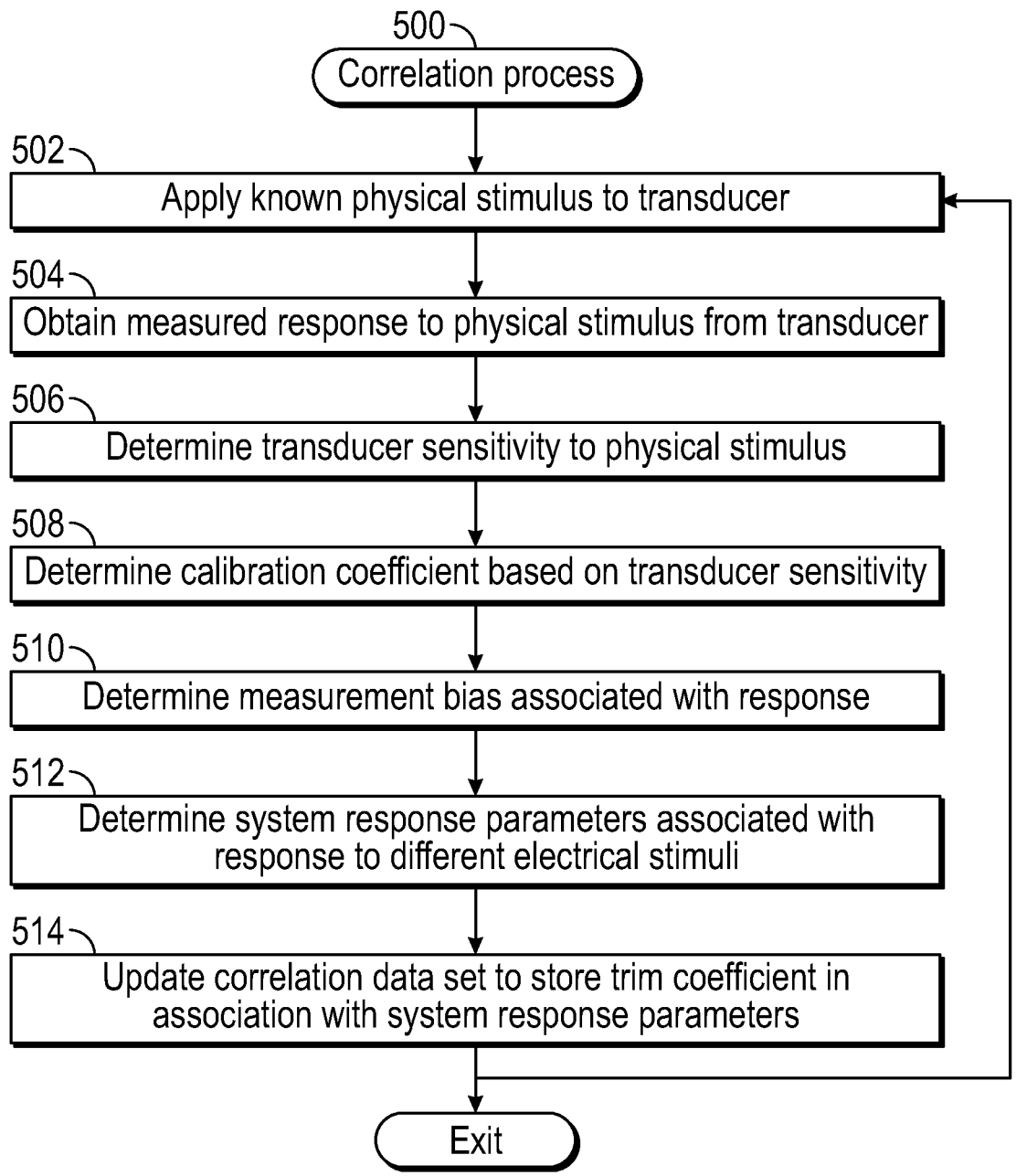
FIG. 5 is a flow diagram illustrating an exemplary correlation process suitable for implementation by the calibration system of FIG. 1 in conjunction with the calibration process of FIG. 2 in accordance with one embodiment of the invention.

FIG. 5 depicts an exemplary correlation process 500 that may be performed to develop a calibration correlation data set for use in electrically-calibrating the sensitivity of a transducer to a physical stimulus in conjunction with the calibration process 200 of FIG. 2. For illustrative purposes, the following description may refer to elements described above in connection with FIG. 1. In practice, portions of the correlation process 500 may be performed by different elements of the calibration system 100, such as, for example, the sensor device 104, the processing system 106, the signal generator 112, and/or the signal processing arrangement 114. It should be appreciated that practical embodiments of the correlation process 500 may include any number of additional or alternative tasks, the tasks need not be performed in the illustrated order, the tasks may be performed concurrently, or the correlation process 500 may be incorporated into a more comprehensive procedure or process having additional functionality not described in detail herein. Moreover, one or more of the tasks shown and described in the context of FIG. 5 could be omitted from a practical embodiment of the correlation process 500 as long as the intended overall functionality remains intact.

The illustrated correlation process 500 initializes or otherwise begins by applying a known physical stimulus to a transducer or sensor device configured to output a measurement of that physical stimulus, obtaining a measured response by the transducer to that known stimulus, and calculating or otherwise determining the sensitivity of the transducer to that physical stimulus based on the relationship between the measured response and the known stimulus (tasks 502, 504, 506). For example, in the case of an acceleration sensor, the transducer 102 and/or the sensor device 104 may be shaken or moved to achieve a known acceleration or acceleration profile and the resulting electrical response output by the sensor device 104 may be utilized to calculate a relationship between the electrical voltage signal corresponding to the capacitance of the transducer 102 and the physical acceleration of the transducer 102. Based on that relationship between the measured response to the known physical stimulus and a desired physical sensitivity, the calibration process 200 may also calculate or otherwise determine a corresponding calibration coefficient value for that sensor device (task 508). For example, based on the voltage-to-acceleration ratio associated with an instance of the sensor device 104 and a desired or intended voltage-to-acceleration ratio for the sensor device 104, the processing system 106 may calculate or otherwise determine a corresponding calibration coefficient value for converting the capacitance of the transducer 102 to a voltage that provides the desired voltage-to-acceleration ratio for the sensor device 104. In exemplary embodiments, the measured physical sensitivity and/or the calibration coefficient value associated with that instance of transducer 102 and/or sensor device 104 is stored or otherwise maintained in the data storage element 108 as part of the calibration correlation data set, as described in greater detail below.

The correlation process 500 continues by determining the measurement bias associated with the current sensor device under test (task 510) in a similar manner as described above (e.g., task 208) and determining system parameter values associated with the transducer based on its response to electrical stimuli having different energy levels (task 512). In this regard, the processing system 106 initiates application of electrical stimuli to the transducer 102 at different voltage levels (e.g., task 202), obtains the measured responses of the transducer 102 to the respective electrical stimuli (e.g., task 204), determines transfer functions for the transducer 102 at the different energy levels (e.g., task 206), and determines sets of system parameter values (e.g., static response, natural frequency, and damping ratio) associated with each different voltage level (e.g., task 210) in a similar manner as described above. The correlation process 500 stores or otherwise maintains the system parameter values and the measurement bias associated with the current sensor device under test in association with the measured physical sensitivity and/or the calibration coefficient value (e.g., tasks 506, 508) as part of the calibration correlation data set (task 514). In this regard, the processing system 106 creates an entry in the data storage element 108 (a transducer or sensor device data set) that maintains an association between system parameter values at different voltage levels, measurement bias, and the corresponding physical sensitivity and/or the calibration coefficient value for each instance of the transducer 102 and/or sensor device 104 that has a physical stimulus applied, which, in turn, may be utilized to establish a mapping or correlation between system parameter values and measurement bias and a resulting physical sensitivity of a transducer 102 and/or sensor device 104 as described above (e.g., task 212). The correlation process 500 is then repeated a number of times to obtain a plurality of different transducer or sensor device data sets, which, in turn, can be utilized to establish or determine a correlation between system parameter values and measurement bias and the corresponding physical sensitivity of a transducer 102 and/or sensor device 104 without having to physically calibrate the transducer 102 and/or sensor device 104.

Figure 6:
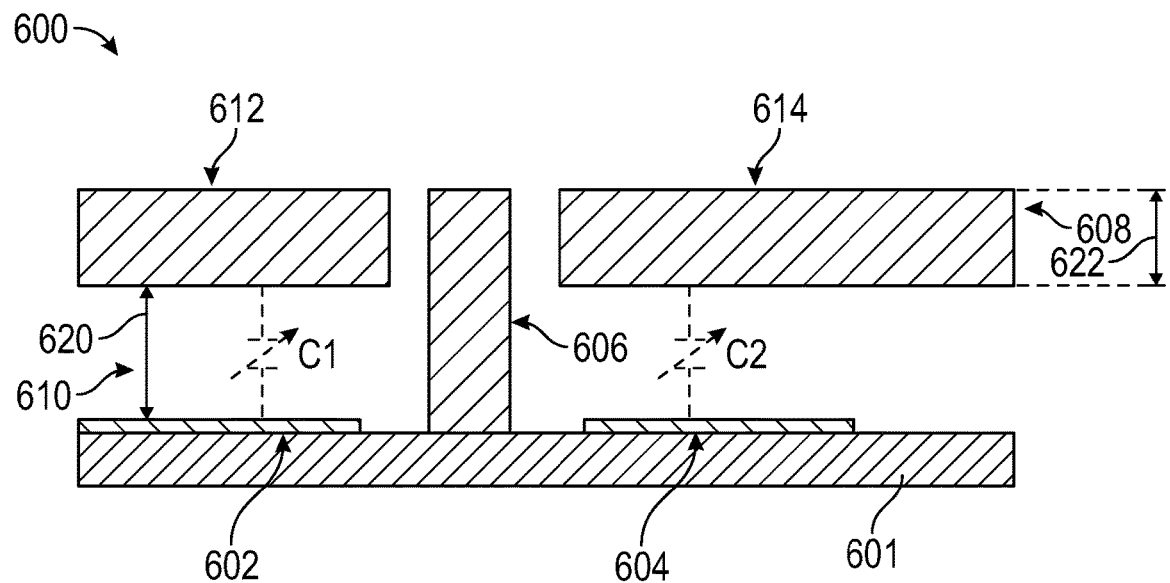
FIGS. 6-7 depict an inertial sensing arrangement suitable for use as the transducer in the calibration system of FIG. 1 in conjunction with the calibration process of FIG. 2 in accordance with one embodiment of the invention, where
Figure 7:
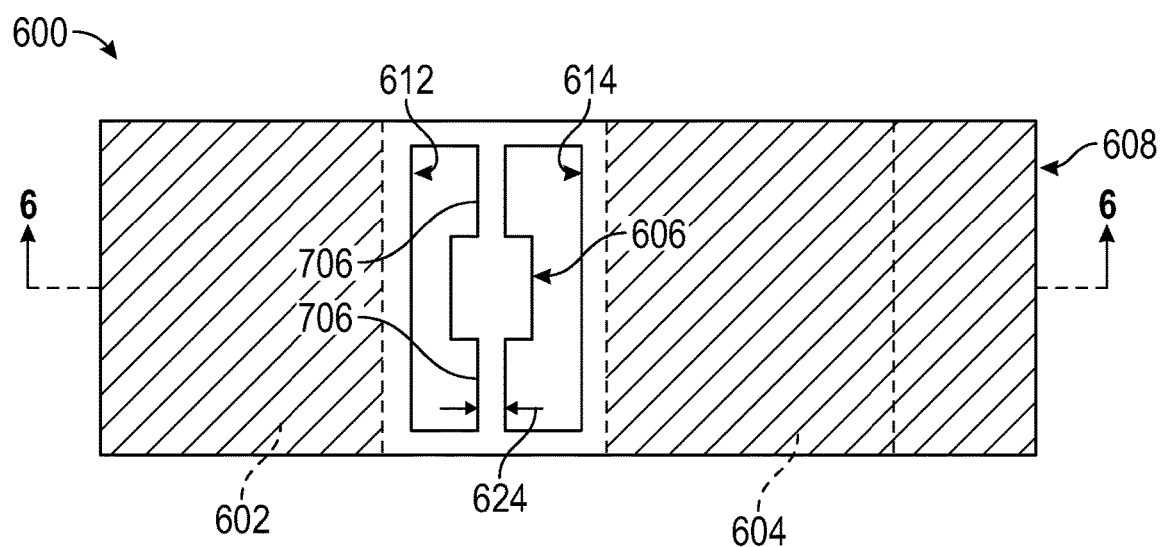

FIGS. 6-7 depict an exemplary embodiment of an inertial sensing arrangement 600 suitable for use as the transducer 102 in the calibration system 100 of FIG. 1 in conjunction with the calibration process 200 of FIG. 2. In exemplary embodiments, the inertial sensing arrangement 600 is realized as a MEMS acceleration sensing arrangement (or accelerometer). The inertial sensing arrangement 600 includes a pair of sense electrodes 602, 604 that are formed or otherwise fabricated on a semiconductor substrate 601. In exemplary embodiments, the sense electrodes 602, 604 are realized as distinct regions of conductive material, such as a metal material or doped polysilicon, that are formed or otherwise fabricated on the semiconductor substrate 601. An anchor structure 606 is formed on the semiconductor substrate 601 between the sense electrodes 602, 604 and supports a proof mass structure 608 overlying the semiconductor substrate 601. In this regard, the proof mass structure 608 separated from the sense electrodes 602, 604 by an airgap 610 which influences the respective capacitances between a respective sense electrode 602, 608 and the proof mass structure 608. In exemplary embodiments, a first portion 612 of the proof mass structure 608 overlying a first sense electrode 602 has a longitudinal dimension (or length) that is less than that of a second portion 614 the proof mass structure 608 overlying a second sense electrode 604, with the relative difference in lengths (and thereby mass) dictating the equilibrium position of the proof mass structure 608 with respect to the substrate 601. In exemplary embodiments, the inertial sensing arrangement 600 is hermetically sealed in a manner that results in the mechanical system, consisting of the proof mass structure 608 about the anchor structure 606 and the torsional spring 706, being overdamped.

Referring again to FIG. 1, in exemplary embodiments, the signal processing arrangement 114 is coupled to the sense electrodes 602, 604 and the electrode provided by the proof mass structure 608 to measure or otherwise quantify the first capacitance associated with the first sense electrode 602 (e.g., the capacitance between the first sense electrode 602 and the shorter portion 612 of the proof mass structure 608) and the second capacitance associated with the second sense electrode 604 (e.g., the capacitance between the second sense electrode 604 and the longer portion 614 of the proof mass structure 608). Based on the relationships between the capacitances and the calibration coefficient value(s) stored in the register 110, the signal processing arrangement 114 generates an output voltage signal representative of the amount of acceleration that the inertial sensing arrangement 600 was subjected to in order to cause the proof mass structure 608 to pivot about the anchor structure 606 and achieve the corresponding capacitances associated with the sense electrodes 602.

The acceleration sensitivity of the inertial sensing arrangement 600 is influenced by the size or distance 620 associated with the airgap 610 between the short portion 612 of the proof mass structure 608 and the sense electrode 602 at the equilibrium position (or zero acceleration position), the thickness of the proof mass structure 608, and the width 624 (or lateral dimension) of the spring arm portions 706 that attach the proof mass structure 608 and the anchor structure 606. Accordingly, process variations associated with fabricating the inertial sensing arrangement 600 influences the acceleration sensitivity of the inertial sensing arrangement 600. At the same time, the system response parameters of the inertial sensing arrangement 600 are influenced by the airgap distance 620, the proof mass thickness 622, and the spring arm width 624, and therefore, a correlation between the system response parameters and the acceleration sensitivity of the inertial sensing arrangement 600 may be established, as described above in the context of FIGS. 1-5. Additionally, the relative voltage difference between (or electrical bias applied to) the sense electrodes 602, 604 may influence the relative impact of the process variables 620, 622, 624 on the system response parameters of the inertial sensing arrangement 600. Therefore, determining the system response parameters at different voltage levels as described above provides information about where the current instance of a transducer lies within the manufacturing distribution.

Referring to FIGS. 6-7 with reference to FIGS. 1-2, in accordance with one embodiment of the calibration process 200 where the transducer 102 is realized as the inertial sensing arrangement 600, the processing system 106 operates the signal generator 112 to provide calibration reference electrical input signals having a different voltage levels and desired signal characteristics to the inertial sensing arrangement 600 by alternately applying a voltage to one of the electrodes 602, 604 in a pseudorandom manner that achieves a broadband electrical stimulus of the inertial sensing arrangement 600 at the particular voltage level. The signal processing arrangement 114 generates or otherwise provides electrical output indicative of the relative capacitances associated with the sense electrodes 602, 604 in response to the electrical stimulus applied by the signal generator 112. In this manner, the processing system 106 obtains a measured response for each pseudorandom electrical stimulus at a particular voltage level from the transducer 102, 600 via the signal processing arrangement 114. As described above, the processing system 106 determines different sets of system response parameters associated with the different voltage levels based on the relationship of the measured response of the transducer 102, 600 at a particular voltage level to the input electrical signal applied to the transducer 102, 600 with that particular voltage level. Using the different system response parameter sets and the measurement bias associated with the signal processing arrangement 114, the processing system 106 determines a corresponding acceleration sensitivity of the transducer 102, 600 based on a calibration correlation data set from the data storage element 108 that maintains an association between acceleration sensitivity and the corresponding combination of system response parameter sets and measurement bias for each of a plurality of other instances of the transducer 102, 600 that were calibrated using a physical stimulus (e.g., tasks 502, 504, 506, 508). In this manner, the processing system 106 maps the system response parameter sets associated with the current instance of the transducer 102, 600 and the measurement bias associated with the current instance of the signal processing arrangement 114 to a corresponding acceleration sensitivity of the transducer 102, 600 without having to determine the fabrication process variables 620, 622, 624 that impact the acceleration sensitivity of the current instance or the process variations associated with the signal processing arrangement 114 of the current instance.

For example, the linear sensitivity ($S_{acceleration}^{device}$) of single-axis inertial sensing arrangement may be determined based on an output voltage ($V_{out}$) influenced by the sense capacitance associated with the electrodes 602, 604 using the equation:

$$S_{acceleration}^{device} = [C_1 \; C_2 \; C_3 \; C_4 \; C_4 \; C_6] \begin{bmatrix} \frac{DC_{gain}(V_1)}{AFE_{gain}} \\ \omega_n(V_1) \\ \zeta(V_1) \\ \frac{DC_{gain}(V_2)}{AFE_{gain}} \\ \omega_n(V_2) \\ \zeta(V_2) \end{bmatrix},$$

where $C_1$-$C_6$ are correlation coefficient values corresponding to the relative strength of correlation of the respective system response parameter values at the respective ones of the different reference voltages ($V_1$ and $V_2$), with the correlation coefficient values derived from the correlation data set. Based on the untrimmed device sensitivity ($S_{acceleration}^{device}$) and the desired target sensitivity for the device, the processing system 106 determines a gain value corresponding to the linear sensitivity calibration coefficient, for example, by dividing the target sensitivity by the device sensitivity. In other words, the mapping by the calibration correlation matrix may be scaled by the inverse of the target sensitivity to obtain the linear sensitivity calibration gain coefficient value. The processing system 106 stores that gain value in the calibration register 110 for use as the linear sensitivity calibration coefficient. In turn, that gain value is subsequently utilized by the signal processing arrangement 114 to amplify, scale, or otherwise adjust the uncalibrated output voltage based on the sense capacitance from the transducer 102 (e.g., the result of the capacitance-to-voltage conversion) and obtain a calibrated output voltage indicative to the acceleration that is provided to the processing system 106.

By virtue of the subject matter described herein, a transducer responsive to a physical stimulus may be electrically-calibrated based on the frequency characteristics of the transducer response to electrical stimulus without having to calculate, determine, or otherwise estimate the fabrication process variables associated with the instance of the transducer being calibrated. While the subject matter is described herein primarily in the context of an overdamped inertial sensing arrangement, such as a hermetically sealed MEMS accelerometer, it should be appreciated that the subject matter described herein is not necessarily limited to any particular type of transducer or damping.

For the sake of brevity, conventional techniques related to semiconductor and/or integrated circuit fabrication, MEMS, biasing, calibration, trimming, and other functional aspects of the subject matter may not be described in detail herein. In addition, certain terminology may also be used herein for the purpose of reference only, and thus are not intended to be limiting. For example, the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description also refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although a schematic shown in the figures may depict direct electrical connections between circuit elements and/or terminals, alternative embodiments may employ intervening circuit elements and/or components while functioning in a substantially similar manner.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the foregoing detailed description.

In conclusion, systems, devices, and methods configured in accordance with example embodiments of the invention relate to:

A method of calibrating a transducer is provided. The method comprises determining a transfer function for the transducer based on a measured response of the transducer to an applied electrical signal, determining a set of values for a plurality of response parameters associated with the transducer based on the transfer function, determining a calibration coefficient value associated with the transducer based at least in part on the set of values and a correlation between physical sensitivity and the plurality of response parameters, and storing the calibration coefficient value in association with the transducer.

In one embodiment determining the calibration coefficient value comprises mapping the set of values to the calibration coefficient value based on a calibration correlation data set including physical sensitivity and respective values of the plurality of response parameters associated with one or more additional instances of the transducer. In a further embodiment, mapping the set of values comprises determining a calibration correlation matrix based on the physical sensitivity and the respective values of the plurality of response parameters associated with one or more additional instances of the transducer, and multiplying a vector including the set of values by the calibration correlation matrix. In one embodiment, the method further comprises applying a pseudorandom electrical signal to the transducer and measuring a response to the pseudorandom electrical signal to obtain the measured response, wherein determining the transfer function comprises determining the transfer function based on a relationship between the pseudorandom electrical signal and the response to the pseudorandom electrical signal.

In another embodiment, determining the set of values associated with the transducer based on the transfer function comprises fitting the transfer function to an overdamped second order transfer function including each damping parameter of the plurality of response parameters having respective value associated with the damping parameter of the set of values.

In another embodiment, the method further comprises determining a value of a measurement bias associated with the measured response, wherein determining the calibration coefficient value associated with the transducer comprises determining the calibration coefficient value associated with the transducer based at least in part on the set of values and the value of the measurement bias and a correlation between physical sensitivity and a combination of the plurality of response parameters and the measurement bias.

In another embodiment, the method further comprises determining a calibrated response of the transducer to a physical stimulus based on an output of the transducer and the calibration coefficient value after storing the calibration coefficient value.

In another embodiment, the method further comprises determining a second transfer function for the transducer based on a second measured response of the transducer to a second applied electrical signal having a different energy level than the applied electrical signal, and determining a second set of values for the plurality of response parameters associated with the transducer based on the second transfer function, wherein determining the calibration coefficient value associated with the transducer comprises determining the calibration coefficient value based at least in part on a combination of the set of values and the second set of values for the plurality of response parameters at the different energy levels and a correlation between physical sensitivity and the plurality of response parameters at the different energy levels.

In another embodiment, the plurality of response parameters includes a static response, a natural frequency, and a damping ratio, wherein determining the set of values comprises determining a first value associated with the static response of the transducer, a second value associated with the natural frequency of the transducer, and a third value associated with the damping ratio of the transducer based on the transfer function, and determining the calibration coefficient value comprises mapping a combination of the first value, the second value, and the third value to the calibration coefficient value based on a correlation between the static response, the natural frequency, and the damping ratio and the physical sensitivity.

In another embodiment, an apparatus for a device is also provided. The device comprises a transducer configured to generate an output responsive to a physical stimulus, a signal generation arrangement coupled to the transducer and configured to apply a calibration reference electrical signal to the transducer, and a data storage element configured to store a calibration coefficient value associated with the transducer, wherein the calibration coefficient value is mapped from response parameters for the transducer corresponding to a transfer function of the response of the transducer relative to the calibration reference electrical signal relative to the calibration reference electrical signal.

In one embodiment, the transducer comprises an overdamped microelectromechanical system (MEMS) sensing arrangement.

In another embodiment, the device further comprises a signal processing arrangement coupled to the data storage element and coupled between the output of the transducer and an output interface to generate a calibrated response of the transducer to the physical stimulus based on the output of the transducer and the calibration coefficient value.

In another embodiment, the calibration coefficient value is mapped from the response parameters for the transducer and a measurement bias associated with the signal processing arrangement.

In another embodiment, a calibration system is provided. The calibration system comprises a transducer to generate an output responsive to a physical stimulus, a signal generation arrangement coupled to the transducer, a signal processing arrangement coupled to the output of the transducer, and a processing system coupled to the signal generation arrangement and the signal processing arrangement, wherein the processing system is configured to operate the signal generation arrangement to apply a calibration reference electrical signal to the transducer, obtain a response of the transducer to the calibration reference electrical signal via the signal processing arrangement, determine a set of values for a plurality of response parameters associated with the transducer based on a relationship between the calibration reference electrical signal and the response, and map the set of values to a calibration coefficient value based at least in part on a correlation between sensitivity to the physical stimulus and the plurality of response parameters.

In one embodiment, the calibration system further comprises a data storage element to store the calibration coefficient value, wherein the signal processing arrangement is coupled to the data storage element to generate a calibrated measurement of the physical stimulus based on the output of the transducer and the calibration coefficient value stored by the data storage element.

In another embodiment, the calibration system further comprises a data storage element to store a calibration correlation data set comprising a plurality of different sets of values for the plurality of response parameters associated with other instances of the transducer associated with respective sensitivities to the physical stimulus of respective instances of the other instances of the transducer, wherein the processing system is coupled to the data storage element to map the set of values to the calibration coefficient value based at least in part on the calibration correlation data set.

In another embodiment, the transducer, the signal generation arrangement and the signal processing arrangement are integrated in a common device package having an output interface coupled to the processing system, wherein the signal generation arrangement is coupled between the output of the transducer and the output interface. In a further embodiment, the transducer comprises an overdamped microelectromechanical system (MEMS) sensing arrangement. In another embodiment, the signal processing arrangement has a value of a measurement bias associated therewith, and the processing system maps the set of values and the value of the measurement bias to the calibration coefficient value based at least in part on the set of values and the value of the measurement bias and a correlation between the sensitivity to the physical stimulus and a combination of the measurement bias and the plurality of response parameters.

In another embodiment, the processing system is configured to operate the signal generation arrangement to apply a second calibration reference electrical signal to the transducer having a different energy level than the calibration reference electrical signal, obtain a second response of the transducer to the second calibration reference electrical signal via the signal processing arrangement, determine a second set of values for the plurality of response parameters associated with the transducer based on a second relationship between the second calibration reference electrical signal and the second response, and map a combination of the set of values and the second set of values to the calibration coefficient value based at least in part on the correlation between the sensitivity to the physical stimulus and the plurality of response parameters at different energy levels.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of calibrating a transducer, the method comprising:
   determining a transfer function for the transducer based on a measured response of the transducer to an applied electrical signal;
   determining a set of values for a plurality of response parameters associated with the transducer based on the transfer function, wherein
      the plurality of response parameters comprise a static response, a natural frequency, and a damping ratio, and
      said determining the set of values comprises determining a first value associated with the static response of the transducer, a second value associated with the natural frequency of the transducer, and a third value associated with the damping ratio of the transducer based on the transfer function;
   determining a calibration coefficient value associated with the transducer based at least in part on the set of values and a correlation between physical sensitivity and the plurality of response parameters, wherein said determining the calibration coefficient value comprises mapping a combination of the first value, the second value, and the third value to the calibration coefficient value based on a correlation between the static response, the natural frequency, and the damping ratio and the physical sensitivity; and
   storing the calibration coefficient value in association with the transducer.

2. The method of claim 1, wherein determining the calibration coefficient value comprises mapping the set of values to the calibration coefficient value based on a calibration correlation data set including physical sensitivity and respective values of the plurality of response parameters associated with one or more additional instances of the transducer.

3. The method of claim 2, wherein mapping the set of values comprises:
   determining a calibration correlation matrix based on the physical sensitivity and the respective values of the plurality of response parameters associated with one or more additional instances of the transducer; and
   multiplying a vector including the set of values by the calibration correlation matrix.

4. The method of claim 1, further comprising:
   applying a pseudorandom electrical signal to the transducer; and
   measuring a response to the pseudorandom electrical signal to obtain the measured response, wherein determining the transfer function comprises determining the transfer function based on a relationship between the pseudorandom electrical signal and the response to the pseudorandom electrical signal.

5. The method of claim 1, wherein determining the set of values associated with the transducer based on the transfer function comprises fitting the transfer function to an overdamped second order transfer function including each damping parameter of the plurality of response parameters having respective value associated with the damping parameter of the set of values.

6. The method of claim 1, further comprising determining a value of a measurement bias associated with the measured response, wherein determining the calibration coefficient value associated with the transducer comprises determining the calibration coefficient value associated with the transducer based at least in part on the set of values and the value of the measurement bias and a correlation between physical sensitivity and a combination of the plurality of response parameters and the measurement bias.

7. The method of claim 1, further comprising determining a calibrated response of the transducer to a physical stimulus based on an output of the transducer and the calibration coefficient value after storing the calibration coefficient value.

8. The method of claim 1, further comprising:
   determining a second transfer function for the transducer based on a second measured response of the transducer to a second applied electrical signal having a different energy level than the applied electrical signal; and
   determining a second set of values for the plurality of response parameters associated with the transducer based on the second transfer function, wherein determining the calibration coefficient value associated with the transducer comprises determining the calibration coefficient value based at least in part on a combination of the set of values and the second set of values for the plurality of response parameters at the different energy levels and a correlation between physical sensitivity and the plurality of response parameters at the different energy levels.

9. A device comprising:
a transducer configured to generate an output responsive to a physical stimulus;
a signal generation arrangement coupled to the transducer and configured to apply a calibration reference electrical signal to the transducer; and
a data storage element configured to store a calibration coefficient value associated with the transducer, wherein
the calibration coefficient value is mapped from response parameters for the transducer corresponding to a transfer function of the response of the transducer relative to the calibration reference electrical signal relative to the calibration reference electrical signal,
the response parameters comprise a static response, a natural frequency, and a damping ratio,
the calibration coefficient is determined by mapping a combination of a first value associated with the static response of the transducer, a second value associated with the natural frequency of the transducer, and a third value associated with a damping ratio of the transducer based on a correlation between the static response, the natural frequency, and the damping ratio and the physical sensitivity.

10. The device of claim 9, wherein the transducer comprises an overdamped microelectromechanical system (MEMS) sensing arrangement.

11. The device of claim 9, further comprising a signal processing arrangement coupled to the data storage element and coupled between the output of the transducer and an output interface to generate a calibrated response of the transducer to the physical stimulus based on the output of the transducer and the calibration coefficient value.

12. The device of claim 9, wherein the calibration coefficient value is mapped from the response parameters for the transducer and a measurement bias associated with the signal processing arrangement.

13. A calibration system comprising:
a transducer to generate an output responsive to a physical stimulus;
a signal generation arrangement coupled to the transducer;
a signal processing arrangement coupled to the output of the transducer; and
a processing system coupled to the signal generation arrangement and the signal processing arrangement, wherein the processing system is configured to:
operate the signal generation arrangement to apply a calibration reference electrical signal to the transducer;
obtain a response of the transducer to the calibration reference electrical signal via the signal processing arrangement;
determine a set of values for a plurality of response parameters associated with the transducer based on a relationship between the calibration reference electrical signal and the response, wherein
the plurality of response parameters comprise a static response, a natural frequency, and a damping ratio, and
the processing system is configured to determine the set of values by being further configured to determine a first value associated with the static response of the transducer, a second value associated with the natural frequency of the transducer, and a third value associated with the damping ratio of the transducer based on the transfer function; and
map the set of values to a calibration coefficient value based at least in part on a correlation between sensitivity to the physical stimulus and the plurality of response parameters, wherein
the processing system is configured to map the set of values to the calibration coefficient value by being further configured to map a combination of the first value, the second value, and the third value to the calibration coefficient value based on a correlation between the static response, the natural frequency, and the damping ratio and the sensitivity to the physical stimulus.

14. The calibration system of claim 13, further comprising a data storage element to store the calibration coefficient value, wherein the signal processing arrangement is coupled to the data storage element to generate a calibrated measurement of the physical stimulus based on the output of the transducer and the calibration coefficient value stored by the data storage element.

15. The calibration system of claim 13, further comprising a data storage element to store a calibration correlation data set comprising a plurality of different sets of values for the plurality of response parameters associated with other instances of the transducer associated with respective sensitivities to the physical stimulus of respective instances of the other instances of the transducer, wherein the processing system is coupled to the data storage element to map the set of values to the calibration coefficient value based at least in part on the calibration correlation data set.

16. The calibration system of claim 13, wherein the transducer, the signal generation arrangement and the signal processing arrangement are integrated in a common device package having an output interface coupled to the processing system, wherein the signal generation arrangement is coupled between the output of the transducer and the output interface.

17. The calibration system of claim 16, wherein the transducer comprises an overdamped microelectromechanical system (MEMS) sensing arrangement.

18. The calibration system of claim 16, wherein:
the signal processing arrangement has a value of a measurement bias associated therewith; and
the processing system maps the set of values and the value of the measurement bias to the calibration coefficient value based at least in part on the set of values and the value of the measurement bias and a correlation between the sensitivity to the physical stimulus and a combination of the measurement bias and the plurality of response parameters.

19. The calibration system of claim 13, wherein the processing system is configured to
operate the signal generation arrangement to apply a second calibration reference electrical signal to the transducer having a different energy level than the calibration reference electrical signal,
obtain a second response of the transducer to the second calibration reference electrical signal via the signal processing arrangement,
determine a second set of values for the plurality of response parameters associated with the transducer based on a second relationship between the second calibration reference electrical signal and the second response, and map a combination of the set of values and the second set of values to the calibration coefficient value based at least in part on the correlation between the sensitivity to the physical stimulus and the plurality of response parameters at different energy levels.

* * * * *